(12) United States Patent
Feigl

(10) Patent No.: US 9,353,627 B2
(45) Date of Patent: May 31, 2016

(54) BLADE FOR A WIND TURBINE

(75) Inventor: Luca Feigl, Barcelona (ES)

(73) Assignee: ALSTOM WIND, S.L.U., Barcelona (ES)

( * ) Notice: Subject to any disclaimer, the term of this patent is extended or adjusted under 35 U.S.C. 154(b) by 535 days.

(21) Appl. No.: 13/878,749

(22) PCT Filed: Oct. 13, 2011

(86) PCT No.: PCT/EP2011/067868
§ 371 (c)(1),
(2), (4) Date: Apr. 10, 2013

(87) PCT Pub. No.: WO2012/049237
PCT Pub. Date: Apr. 19, 2012

(65) Prior Publication Data
US 2013/0209263 A1 Aug. 15, 2013

(30) Foreign Application Priority Data
Oct. 15, 2010 (EP) .................................... 10382269

(51) Int. Cl.
| B63H 1/20 | (2006.01) |
| --- | --- |
| B64C 11/04 | (2006.01) |
| F03B 3/12 | (2006.01) |
| F03D 11/00 | (2006.01) |
| F01D 5/14 | (2006.01) |
| F03D 1/00 | (2006.01) |
| F03D 1/06 | (2006.01) |

(52) U.S. Cl.
CPC ..... F01D 5/14 (2013.01); F03D 1/001 (2013.01); F03D 1/065 (2013.01); F03D 1/0658 (2013.01);
(Continued)

(58) Field of Classification Search
CPC ............. F01D 5/14; F01D 5/30; F03D 1/065; F03D 1/0658; F03D 11/00; F03D 1/0633; F03D 1/0675; F03D 1/0691; F03D 1/005; Y02E 10/721; Y10T 29/49336
USPC .................................. 416/204 R, 220 R, 248
See application file for complete search history.

(56) References Cited

U.S. PATENT DOCUMENTS

| 4,915,590 A * | 4/1990 | Eckland ................ F03D 1/0658 29/889.21 |
| --- | --- | --- |
| 7,163,378 B2 * | 1/2007 | Kildegaard ........... B29C 70/525 416/230 |

(Continued)

FOREIGN PATENT DOCUMENTS

| WO | WO 2008/089765 | 7/2008 |
| --- | --- | --- |
| WO | WO 2009/128708 | 10/2009 |

(Continued)

OTHER PUBLICATIONS

International Search Report and Written Opinion for EP2011/067868, mailed Nov. 9, 2011, 12 pgs.

Primary Examiner — Jorge Pereiro
Assistant Examiner — Deming Wan
(74) Attorney, Agent, or Firm — Squire Patton Boggs (US) LLP

(57) ABSTRACT

A blade for a wind turbine comprising a blade root portion, the blade root portion defining an annular mounting surface for coupling to a hub or extender of the wind turbine and comprising a plurality of first holes provided with an internal bushing, wherein at least one first internal bushing comprises at least one first securing member, and at least one second internal bushing comprises at least one second securing member, the first and second bushings being located in or near substantially opposite positions of the annular mounting surface, and wherein said first and second securing members are adapted to receive connecting means for connecting the first securing member with the second securing member.

16 Claims, 9 Drawing Sheets

(52) U.S. Cl.
CPC ............... *F03D 11/00* (2013.01); *Y02E 10/721* (2013.01); *Y02E 10/722* (2013.01); *Y02E 10/728* (2013.01); *Y10T 29/49336* (2015.01)

(56) References Cited

U.S. PATENT DOCUMENTS

| 8,753,050 | B2 * | 6/2014 | Cyrus | B60P 3/40 410/120 |
| 2004/0091346 | A1 * | 5/2004 | Wobben | B60P 3/40 414/563 |
| 2010/0143148 | A1 | 6/2010 | Chen et al. | |
| 2010/0254813 | A1 * | 10/2010 | Dawson | B66C 23/207 416/146 R |
| 2011/0131809 | A1 * | 6/2011 | Riddell | F03D 1/00 29/888 |

FOREIGN PATENT DOCUMENTS

| WO | WO 2009/155920 | 12/2009 |
| WO | WO 2010/012280 | 2/2010 |

* cited by examiner

BLADE FOR A WIND TURBINE

The present invention relates to a blade for a wind turbine. The invention further relates to a method of reducing deformation of a wind turbine blade.

BACKGROUND ART

The blades in a wind turbine are typically attached, at a blade root portion, to a rotor hub, either directly or through an extender.

The blades in a wind turbine are typically made from composite materials: reinforcing fibres may be bonded to one another with a resin and, subsequently, cured to consolidate. Different kinds of fibres (e.g. glass, carbon, combinations) and resins (e.g. epoxy) may be used in different forms (e.g. prepreg, fibre sheets). Such composite materials may not have the structural integrity to provide a secure fixing mechanism into which, for example, threaded bolts may be directly inserted. For this reason, it is known for wind turbine blades to comprise metal inserts or bushings which are embedded into the blade root in a direction parallel to that of the longitudinal axis of the blade. Studs, bolts or rods can be used in combination with these bushings to achieve a secure connection between the hub or extender and the blade.

A manufacturing process of a blade of a wind turbine in general terms may comprise a first step of molding and curing two separate halves of the blade made out of composite material and a second step of unmolding these two halves and joining them together. Alternatively, a complete blade may be manufactured in a single molding step. Once the blade has been manufactured it remains in storage until the wind turbine is finally installed. Typically, said storage may last from one month up to one year.

Although blades are made from composite material in order to reduce its weight, it is important to consider the fact that a finished blade, made of composite, still has a considerable weight.

Therefore, a problem derived from above mentioned storage time is that the blade root portion deforms in the storage position due to the weight of the whole blade (see FIG. 1).

FIG. 1 schematically shows a blade for a wind turbine in a storage position. Arrow A shows the force of the weight acting on the blade root portion 11 that may cause deformation of the mounting surface 111 of the blade root portion.

The orientation of the blade in FIG. 1 is merely one of several possible storage positions. The ideal storage position may depend on the length of the blade, its shape, its curvature and other designs parameters of the blade.

Another problem, related to the one mentioned above derives from speeding up the manufacturing process of the blade. Blades or blade halves are often taken out of the mold when the curing process is not yet completely finished. The resin may thus still be partly soft and the blade can thus more easily deform under its own weight.

In practice, the deformation of the blade root can lead to a more vulnerable attachment at the hub. The attachment holes of the blade may not be completely aligned with the attachment holes of the hub or extender, and the studs or bolts used for connecting the blade to the hub may not be completely centered in their holes. In operation, they thus may be subjected to transverse loads, potentially shortening their lifetime and the lifetime of the blades.

SUMMARY OF THE INVENTION

It is an object of the present invention to at least partially overcome some of above mentioned drawbacks.

In a first aspect, the invention provides a blade for a wind turbine comprising a blade root portion, the blade root portion defining an annular mounting surface for coupling to a hub or extender of the wind turbine and comprising a plurality of first holes provided with an internal bushing, wherein at least one first internal bushing may comprise at least one first securing member, and at least one second internal bushing may comprise at least one second securing member. The first and second bushings may be located in or near substantially opposite positions of the annular mounting surface, wherein said first and second securing members may be adapted to receive connecting means for connecting the first securing member with the second securing member.

In this aspect of the invention, when the connecting means are fastened to securing members of at least two internal bushings located at substantially opposite positions, a tensile force may act between said substantially opposite bushings. Said tensile force may thus cease outwards deformation of the annular mounting surface of the blade root due to the weight of the blade when the blade is in a storage position. A proper distance between substantially opposite bushings may thus be maintained, so the studs or bolts used for connecting the blade to the hub may be centered in the holes provided with these bushings. The lifetime of these studs or bolts and of the blades may thus be increased.

In some embodiments, the connecting means may comprise tensioning means for adjusting the tension of the connecting means connecting the first and second securing members. In these embodiments, the tension between two sides of a blade may be more precisely controlled. Additionally, the tension between two sides of the blade may be varied over time in accordance with circumstances.

Additionally, in this aspect, some embodiments may comprise a plurality of connecting means arranged to each connect at least one first securing member of at least one first bushing with at least one second securing member of at least one second bushing, the second bushings may be arranged in or near substantially opposite position of their corresponding first bushings.

Some embodiments may comprise one or more connecting means arranged in a substantially horizontal direction with respect to the blade in a storage position. In these embodiments, the tensile force may be applied in the most critical direction to avoid deformation.

In another aspect, the invention provides a wind turbine rotor comprising a hub and at least one blade substantially as hereinbefore described. In some embodiments the wind turbine rotor may further comprise an extender.

In a further aspect, the invention provides a method of reducing deformation of the blade root in a blade substantially as hereinbefore described, the method comprising the step of connecting at least one first and one second securing members to each other with connecting means.

In some embodiments, the step of connecting at least one first and one second securing members to each other with connecting means is carried out substantially directly after manufacture of the blade.

When two blade halves (or alternatively a blade) have been taken out of a mold before completion of the curing process, deformations under the blades own weight may be minimized by fastening two substantially opposite securing members provided in two substantially opposite bushings of the blade root portion with connecting means as hereinbefore explained.

In some embodiments, the connecting means may be arranged between at least one first and one second securing member located at substantially diametrically opposite positions and the securing members are arranged such that one or more connecting means may be arranged in a substantially horizontal direction, when the blade is in storage position.

In some embodiments, after the step of connecting at least one first and one second securing members to each other with connecting means has been carried out, the tension in said connecting means may be adapted so as to maintain an appropriate distance between substantially opposite bushings comprising said at least one first and second securing members.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1:
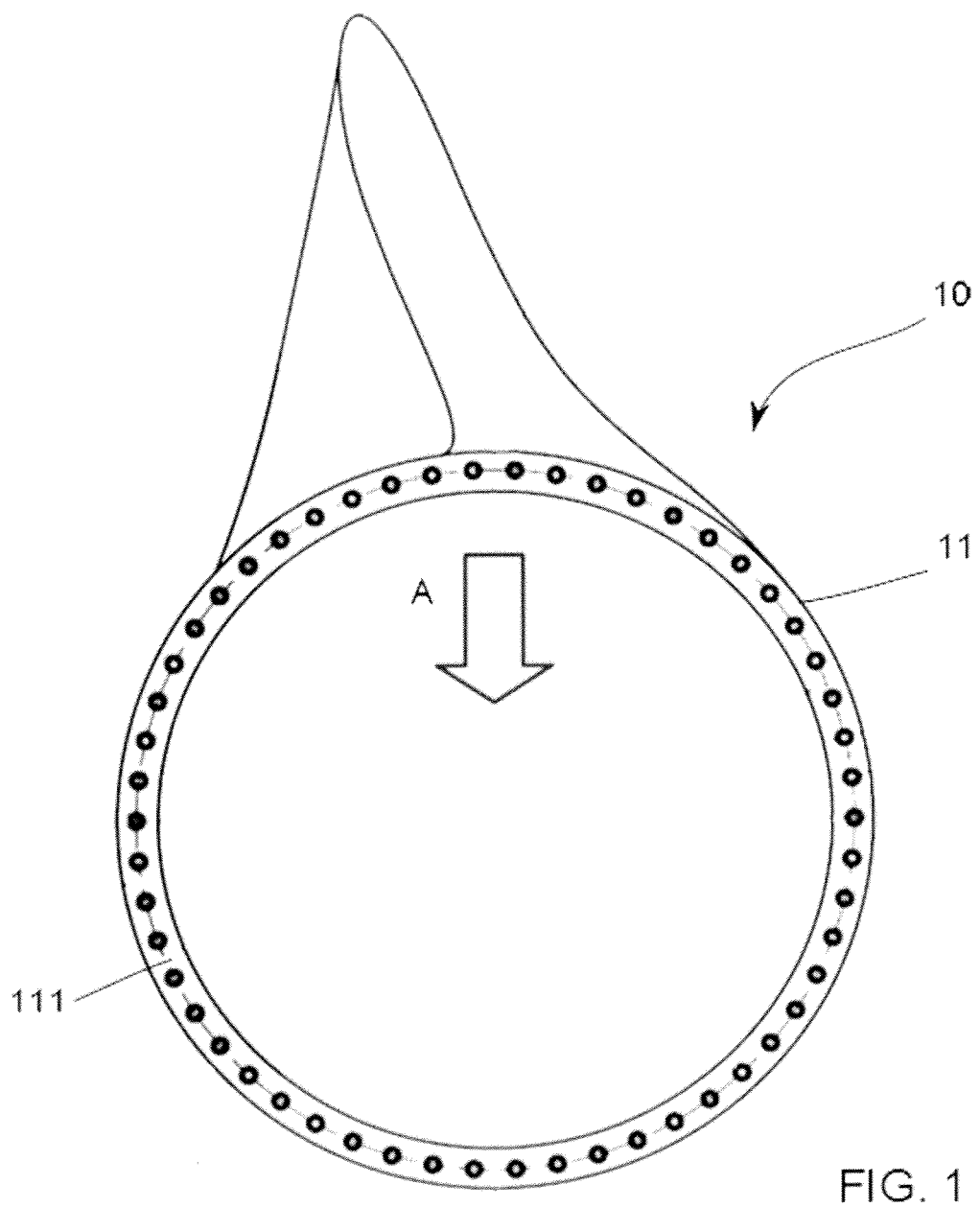
FIG. 1 illustrates a blade for a wind turbine in a storage position.
Figure 2:
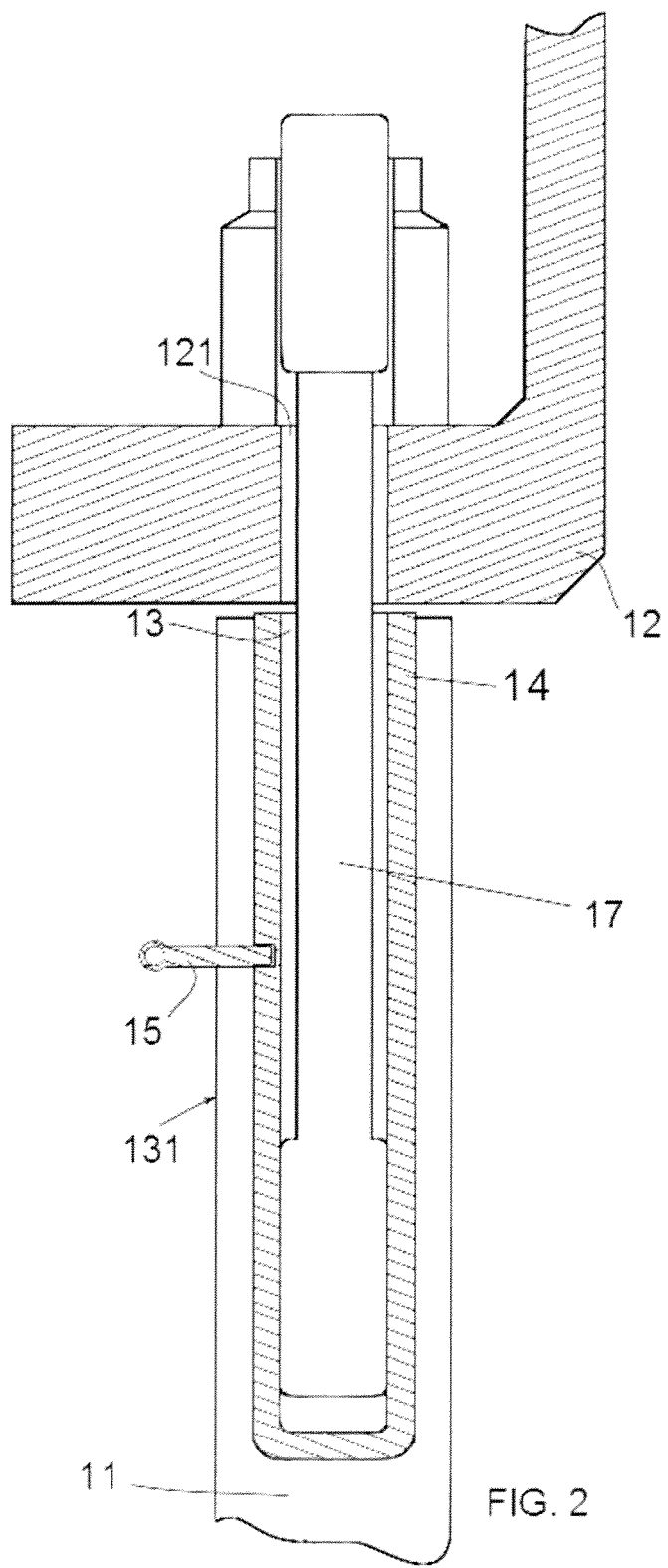
FIG. 2 shows a section view of the attachment of the blade for a wind turbine to a hub or extender of the wind turbine according to a first embodiment.

Particular embodiments of the present invention will be described in the following by way of non-limiting examples, with reference to the appended drawings, in which:

FIG. 2 represents a longitudinal section view of the attachment of a blade at a blade root portion 11 coupled to a mounting flange 12 of a hub or extender of a wind turbine. The blade root portion defines an annular mounting surface 111 (more clearly shown in FIGS. 1 and 4a-4e) for coupling to the hub or extender and comprises a plurality of first holes 13 that may be provided with an internal bushing 14.

According to a first embodiment shown in FIG. 2, one or more of the bushings 14 may comprise a securing member 15 adapted to receive connecting means 16 (shown in FIGS. 4a-4e). As may be seen in FIG. 2, the securing members 15 may protrude from an inner wall 131 of the first hole 13 of the blade root 11.

According to this first embodiment illustrated in FIG. 2, the securing members 15 may be threaded in the bushings 14.

It should however be noted that there are many alternatives ways for connecting a securing member to a bushing, such as securing members welded to bushings, securing members integrally machined with bushings or any other suitable coupling method.

Figure 3A:
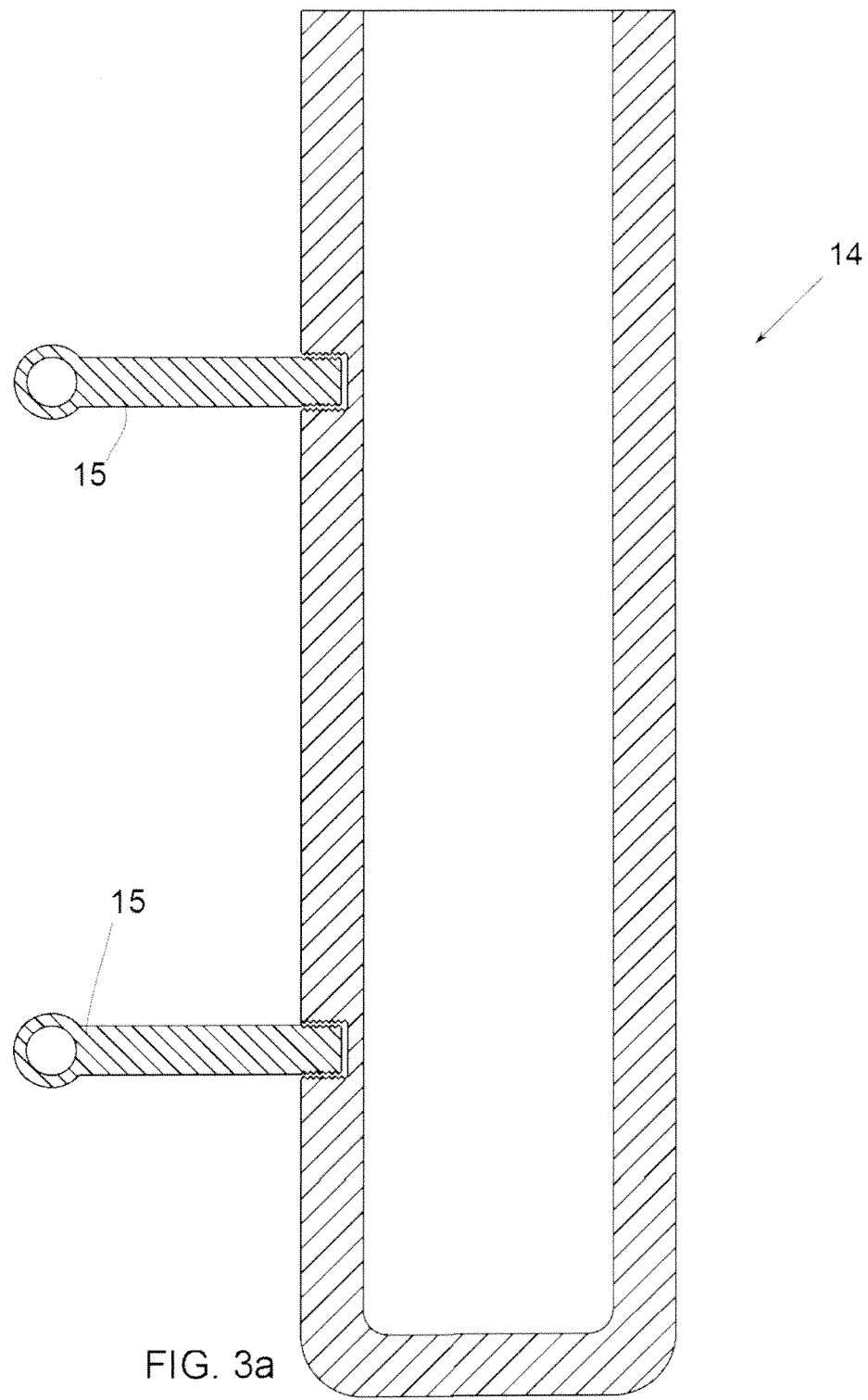
FIGS. 3a-3b show a section view of an internal bushing according to further embodiments of the present invention, having a plurality of securing members adapted to receive connecting means.
Figure 3B:
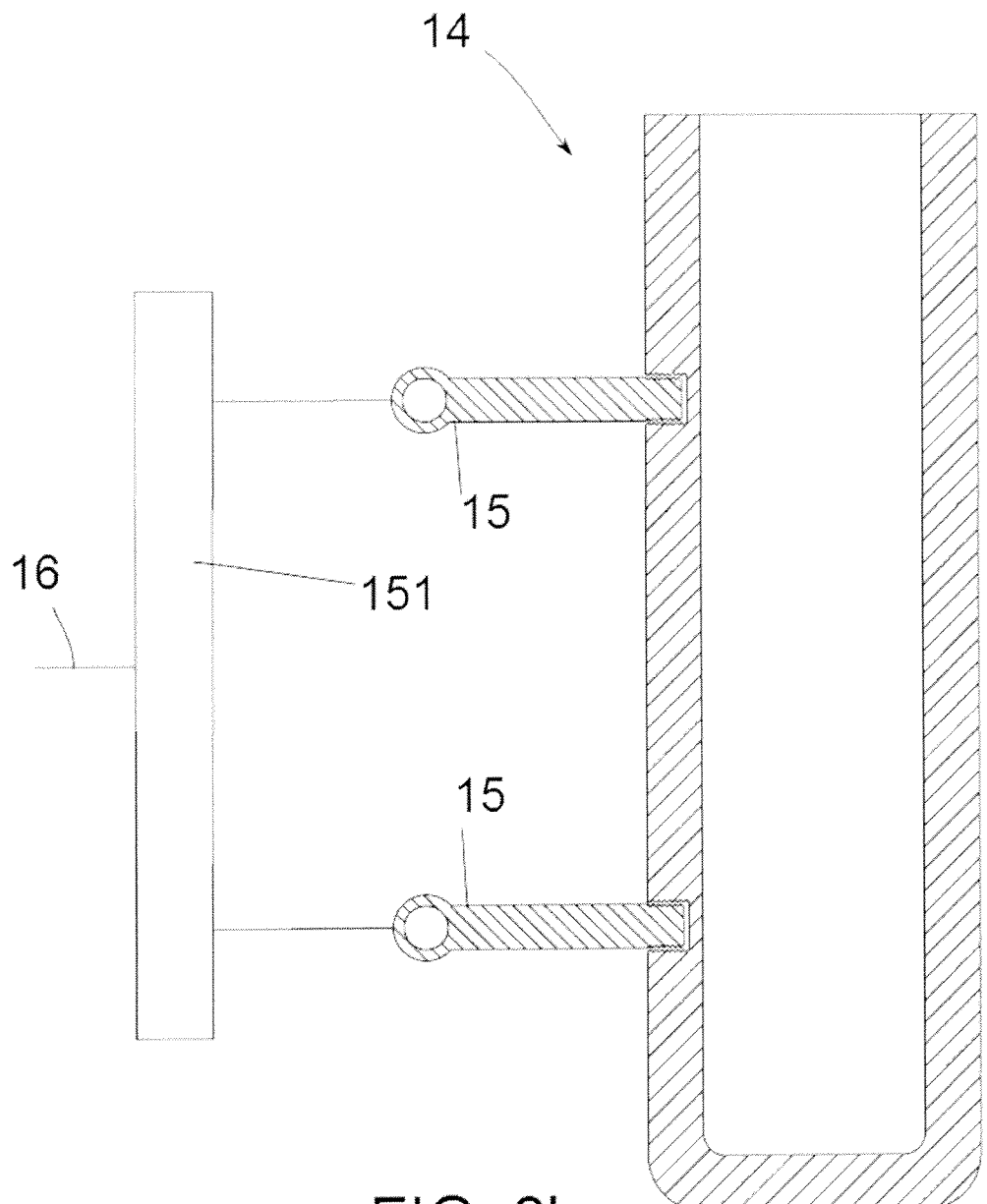

In the embodiment illustrated in FIGS. 2 and 3a-3b the securing members 15 comprise an eyelet. The eyelets of opposing securing members may be connected e.g. with a cable comprising hooks that can enter in the eyelets at either end.

In addition, FIG. 2 illustrates a mounting flange 12 of a hub or extender of a wind turbine that may comprise a plurality of second holes 121. These second holes 121 of the mounting flange 12 may be aligned with the first holes 13 of the blade enabling the insertion of fasteners 17 for securing the blade 10 to the hub or extender. In general, bolts, studs, rods or similar are used as fasteners.

It should be noted that a mounting flange 12 such as illustrated in FIG. 2 may form part of a hub or extender. A blade root 11 may be directly mounted on the hub or may be mounted on an extender attached to the hub.

Different embodiments may comprise different complementary securing members and connecting means, which may preferably be easily mounted. For example: in one embodiment a wire or cable may be used as connecting means comprising a hook at either end of the wire or cable. The securing members may comprise a suitable eyelet in which the hooks of the cable can be inserted. Alternatively, the cable or wire may comprise an eyelet, whereas the securing members may comprise a hook. In yet other embodiments, the connecting means may be a rod which can be connected to a securing member comprising e.g. a hole. The rod may further comprise a thread at either end and the complementary hole may comprise an inner thread.

According to different embodiments, the securing members 15 may be selected among the group consisting of a hook, an eyelet, a stud, a clasp, a ring, a snap fastener, a hole, a hanger, a loop, a clamp, a pair of bracket projections or similar, depending on the type of connecting means that will be used.

According to different embodiments the connecting means 16 may be selected from the group consisting of a wire, a cable, a cord, a string, a belt, a stick, a rope, a rod or similar, depending on the type of securing member used.

FIG. 3a shows a section view of a bushing 14 according to a second embodiment wherein the bushing 14 may comprise two eyelets 15.

FIG. 3b shows a further embodiment of a bushing 14 comprising two eyelets 15 connected to each other through a bar 151. The bar 151 may be connected to the eyelets 15 through cables or hooks. Alternative connecting pieces instead of a bar 151 for connecting two securing members to each other may also be used.

It is understood that the number of securing members may vary depending e.g. on the size of the blade root portion. In further embodiments, more securing members may be provided in a single bushing and a suitable connecting piece may connect more than two securing members. An aspect of the embodiments wherein various securing members are connected via such a connecting piece is that the loads may be well distributed along the length of a bushing.

FIGS. 4a-4e show possible arrangements of wind turbine blades in storage in accordance with the present invention.

Figure 4A:
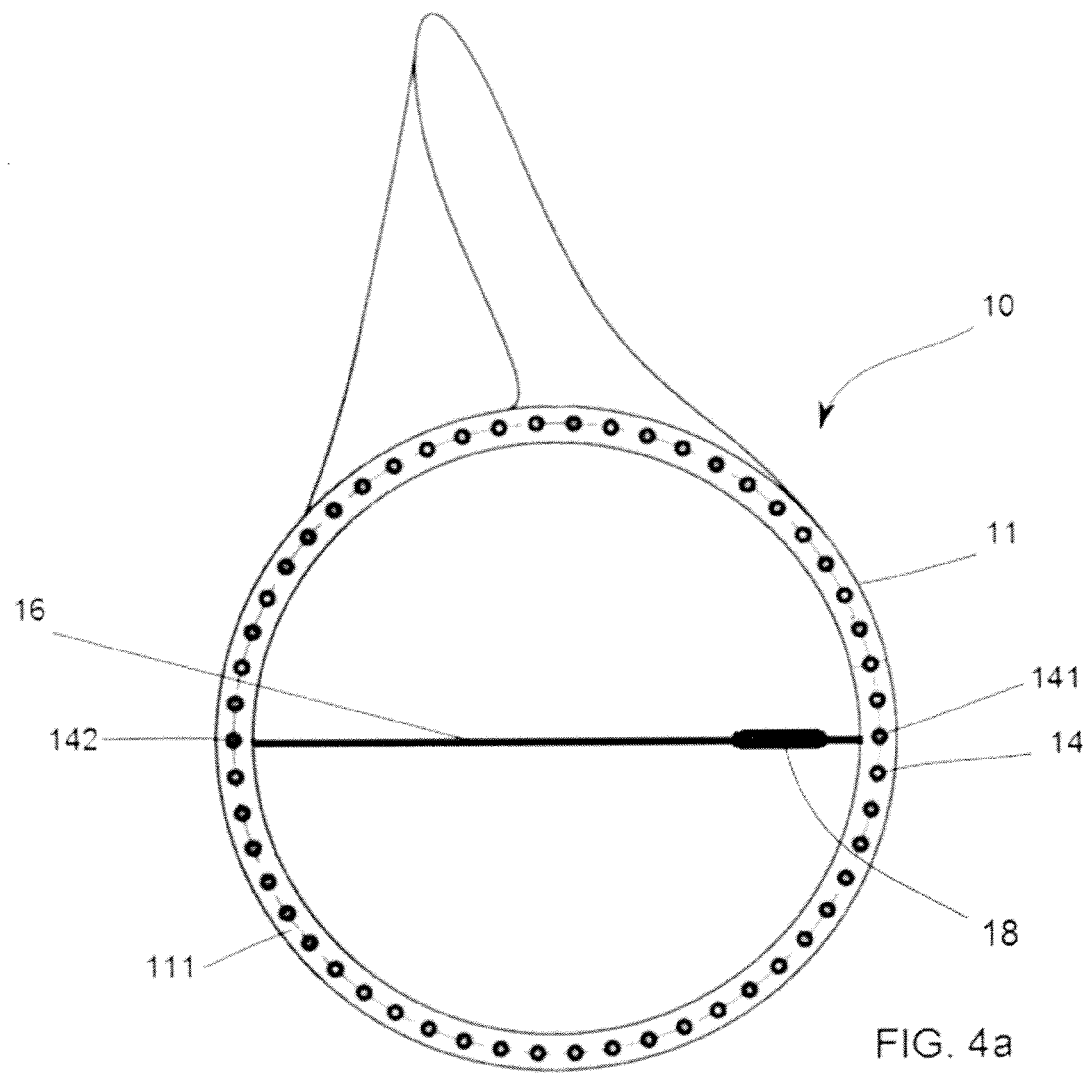
FIGS. 4a-4e schematically illustrate further embodiments of the present invention.

FIG. 4a illustrates the case wherein a single cable 16 is fastened between two diametrically opposite bushings 141, 142 that may be in a substantially horizontal direction with respect to the blade 10 in a storage position. In FIG. 4a, the cable 16 is provided with a turnbuckle 18 which serves as tensioning means. Using the turnbuckle 18, a desired tension for avoiding deformation of the blade may be set.

In other embodiments, other tensioning means may be used such as e.g. a nut, a washer or similar in combination with e.g. a rod as connecting means in order to adapt the tension of the connecting means.

In other embodiments, the correct tension may automatically be guaranteed by choosing a cable (or other connecting means) of a suitable length and/or elasticity.

Figure 4B:
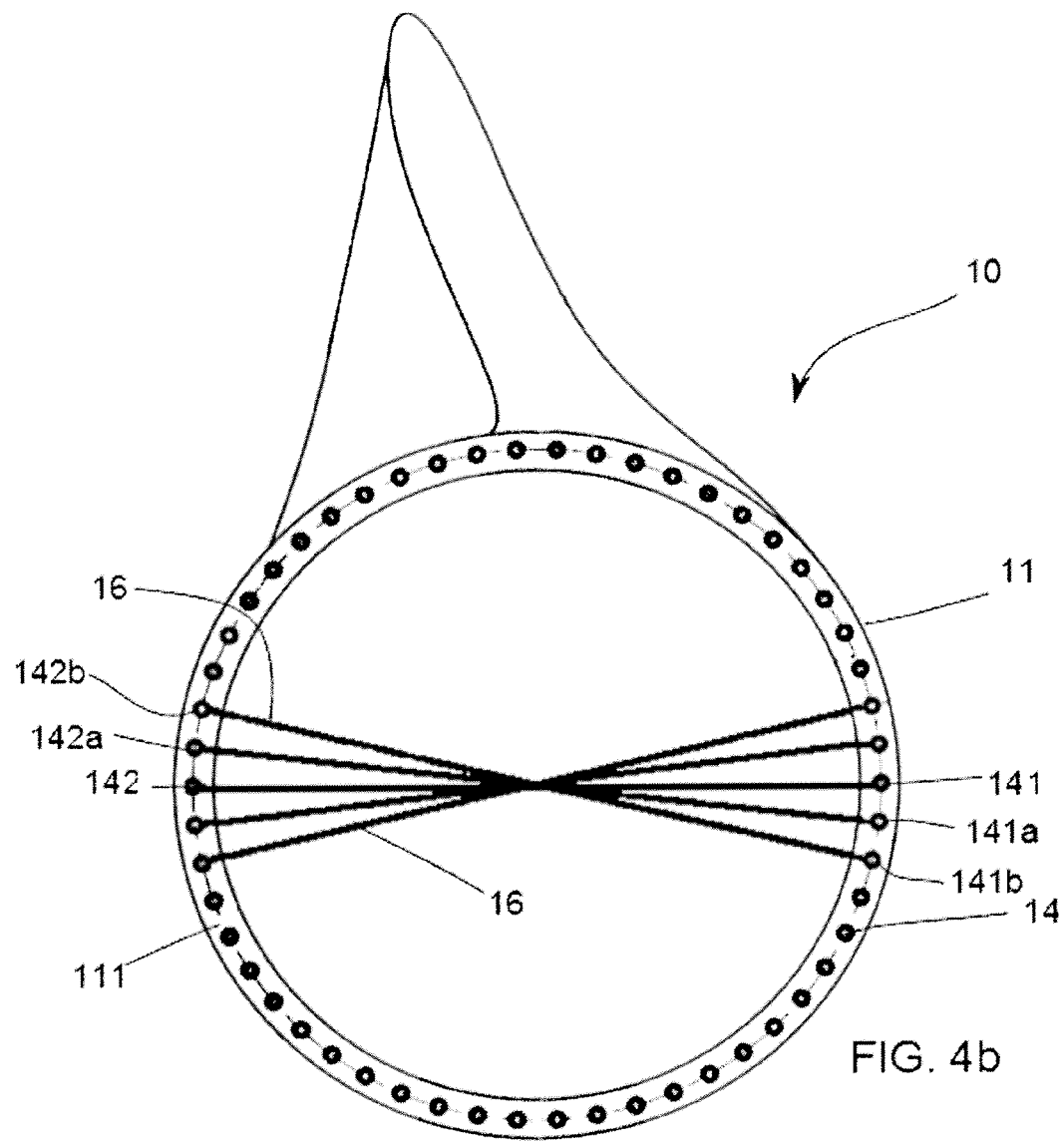

FIG. 4b shows an embodiment comprising five cables 16 connecting securing members in consecutive bushings 141, 141a, 141b to respective diametrically opposite bushings 142, 142a, 142b. In this embodiment, the cables 16 are arranged close to a substantially horizontal direction with respect of the blade 10 in a storage position.

Figure 4C:
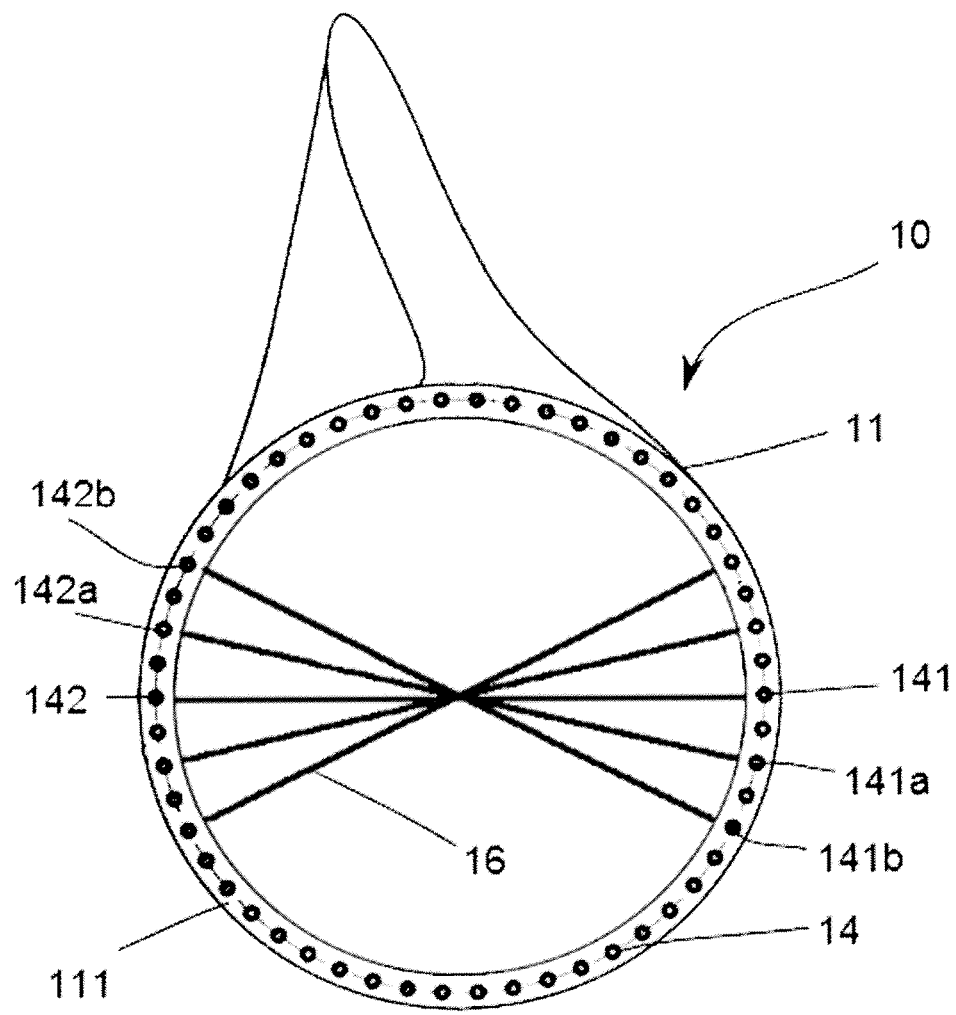

FIG. 4c shows another embodiment comprising five cables 16 connecting securing members in alternate bushings 141, 141a, 141b and their diametrically opposite bushings 142, 143a, 142b. In comparison with the embodiment of FIG. 4b, the cables have been spaced apart.

Figure 4D:
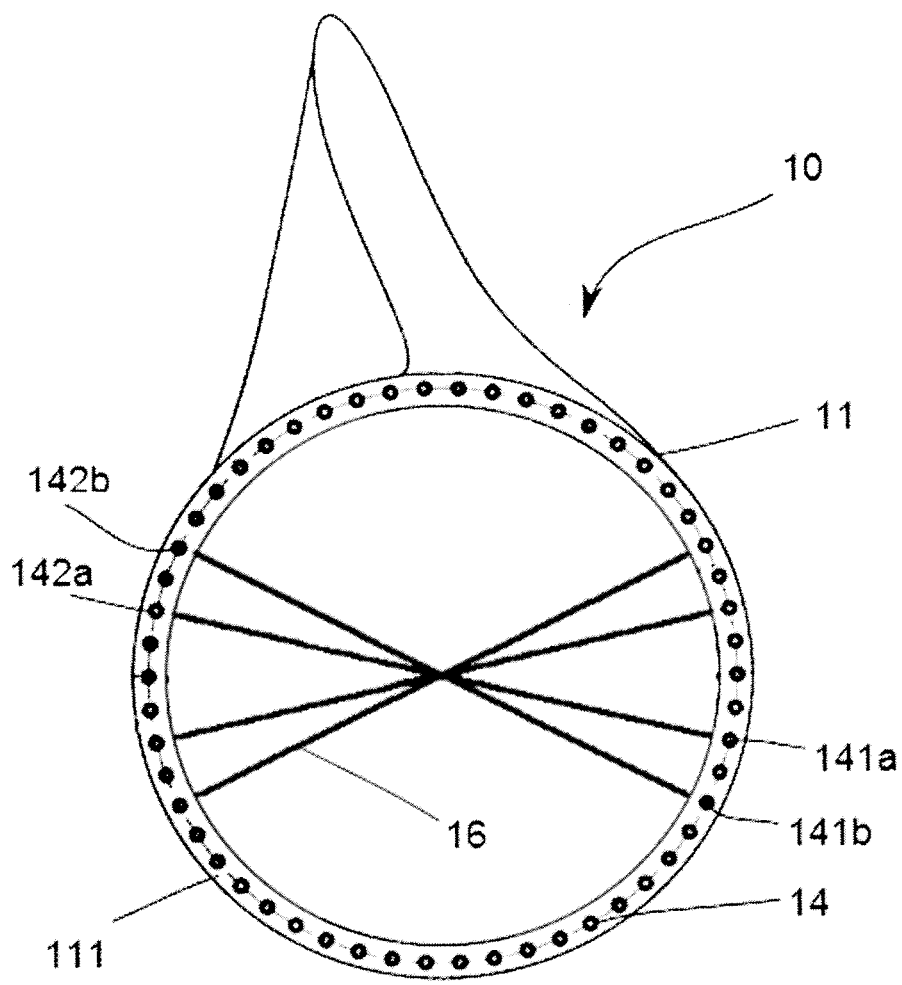

FIG. 4d shows an embodiment similar to that shown in FIG. 4c but with four cables 16 connecting securing members in alternate bushings 141a, 141b with their diametrically opposite bushings 142a, 142b. In the arrangement represented in FIG. 4d the cable arranged as horizontal as possible with respect the blade 10 in a storage position present in FIG. 4c has been removed. In comparison with the embodiments of FIGS. 4b and 4c, the cables are further removed from the horizontal position.

Figure 4E:
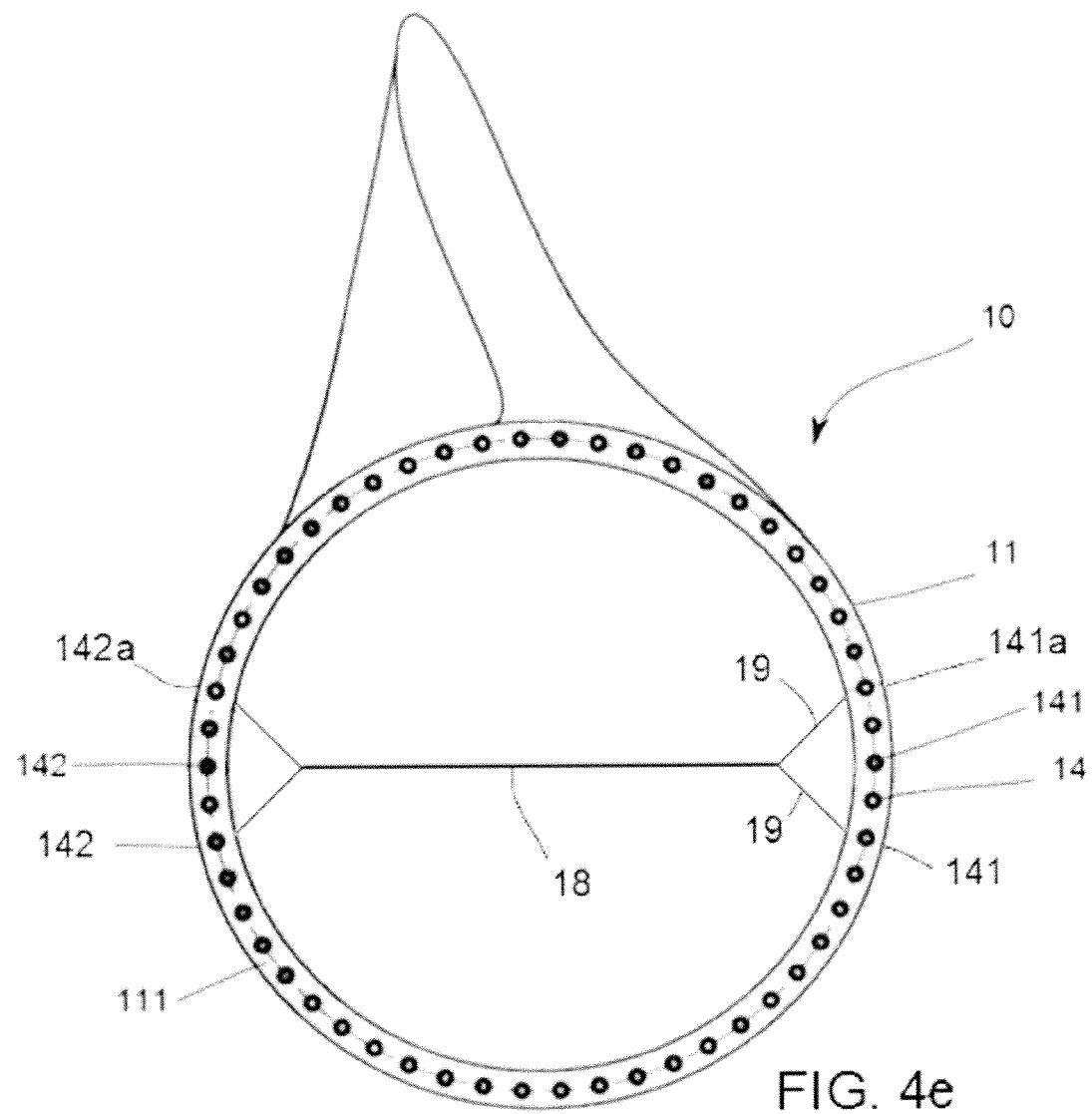

FIG. 4e shows an embodiment comprising a single rod 18 fastened at either end by means of at least two cables 19 attached to different bushings 141, 141a and their substantially opposite bushings 142, 142a at the other end.

Various possible arrangements of the connecting means have been shown in FIGS. 4a-4e. The most suitable of these arrangements (or even further alternatives) may depend e.g. on the shape and size of the blade root, the materials used, tension that needs to be provided and deformation experienced without the cables.

In accordance with preferred embodiments of the invention, the connecting means are mounted on the securing means arranged in the bushings 14 substantially immediately after manufacture of the blade 10 so as to limit the deformation as much as possible.

In some embodiments, the blade root portion 11 may further comprise a metal annular flange (not represented in the drawings) along the periphery of the annular mounting surface 111 of the blade root 11. Such a flange would comprise a plurality of corresponding holes suitable for fitting fasteners, such that the blade with flange can be connected to the hub (or extender).

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A blade for a wind turbine comprising a blade root portion, the blade root portion defining an annular mounting surface for coupling to a hub or extender of the wind turbine and the blade root portion comprising a plurality of first holes, each provided with an internal bushing, wherein the blade root portion comprises at least one first internal bushing and at least one first securing member connected to the first internal bushing, and at least one second internal bushing and at least one second securing member connected to the second internal bushing, the first and second securing members being selected from the group consisting of a hook, an eyelet, a stud, a clasp, a ring, a snap fastener, a hole, a hanger, a loop, a clamp and a pair of bracket projections and being located in radially opposite positions of the annular mounting surface, and wherein the first and second securing members protrude from an inner wall of the blade root portion and are adapted to receive one or more connectors for connecting the first securing member with the second securing member.

2. The blade according to claim 1, wherein the connector includes a turnbuckle for adjusting its tension.

3. The blade according to claim 1, wherein the at least one first and/or second securing member is machined with the respective internal bushing, thereby forming an integral piece.

4. The blade according to claim 1, wherein the at least one first and/or second securing member is threaded in the internal bushing.

5. The blade according to claim 1, wherein the at least one first and/or second internal bushing comprises a plurality of securing members adapted to receive the connectors.

6. The blade according to claim 1, wherein the connector is selected from the group consisting of a wire, a cable, a cord, a string, a belt, a stick, and a rope and the connector connects the first securing member of the first internal bushing with the second securing member of the second internal bushing, the second internal bushing being in a radially opposite position of the annular mounting surface from the first internal bushing.

7. The blade according to claim 1, wherein the connector connects the first and second securing members such that the connector is arranged in a horizontal direction that is substantially perpendicular to the direction of gravity.

8. The blade according to claim 1, wherein the first and second securing members are connected by one or more connectors and the one or more connectors are steel cables.

9. The blade according to claim 1, wherein the blade root portion further comprises an annular rigid flange in the periphery of the annular mounting surface of the blade root portion.

10. A method of reducing deformation of the blade root in the blade according to claim 1, comprising the step of connecting at least one first and one second securing member to each other with the connector selected from the group consisting of a wire, a cable, a cord, a string, a belt, a stick, a rope and a rod.

11. The method of reducing deformation according to claim 10, wherein the step of connecting the at least one first and one second securing members to each other with the connectors is carried out directly after manufacture of the blade.

12. The method of reducing deformation according to claim 10, wherein the connectors are arranged between the at least one first and one second securing members located at radially opposite positions, the securing members being arranged such that the connectors are arranged in a horizontal direction that is substantially perpendicular to the direction of gravity.

13. The method of reducing deformation according to claim 10, wherein after the at least one first and one second securing members have been connected to each other with the connectors, a tension in the connectors is increased so as to maintain an appropriate distance between the radially opposite bushings having connected thereto the at least one first and one second securing members.

14. A wind turbine rotor comprising a hub and at least one blade according to claim 1.

15. A blade for a wind turbine comprising a blade root portion, the blade root portion defining an annular mounting surface for coupling to a hub or extender of the wind turbine and the blade root portion comprising a plurality of first holes, each provided with an internal bushing, wherein the blade further comprises either (A) or (B)

(A) at least one first eyelet connected to at least one first internal bushing, and at least one second eyelet connected to at least one second internal bushing, the first and second internal bushings being located in radially opposite positions of the annular mounting surface, and wherein the first and second eyelets protrude from an inner wall of the blade root portion and are adapted to receive a cable comprising a hook at either end of the cable for connecting the first eyelet with the second eyelet; or (B) at least one hook connected to at least one first internal bushing, and at least one second hook connected to at least one second internal bushing, the first and second internal bushings being located in radially opposite positions of the annular mounting surface, and wherein the first and second hooks protrude from an inner wall of the blade root portion and are adapted to receive a cable comprising an eyelet at either end of the cable for connecting the first hook with the second hook.

16. A blade for a wind turbine comprising a blade root portion, the blade root portion defining an annular mounting surface for coupling to a hub or extender of the wind turbine and comprising a plurality of first holes of the blade root portion, wherein each of the first holes of the blade root portion are provided with an internal bushing, wherein
- at least one first internal bushing and at least one second internal bushing located in radially opposite positions of the annular mounting surface,
- a second hole formed in the first internal bushing,
- a third hole formed in the second internal bushing, and
- a rod having one end received in the second hole and an opposite end received in the third hole.

\* \* \* \* \*